United States Patent [19]

Arbouzov

[11] Patent Number: 5,701,487
[45] Date of Patent: Dec. 23, 1997

[54] METHOD AND APPARATUS FOR DISPLAYING LOCATIONS OF ERRORS DETECTED INSIDE SOFTWARE MACRO CALLS

[75] Inventor: Leonid M. Arbouzov, Novosibirsk, Russian Federation

[73] Assignee: Sun Microsystems, Inc., Mountain View, Calif.

[21] Appl. No.: 410,672

[22] Filed: Mar. 27, 1995

[51] Int. Cl.⁶ .................................................. G06F 9/45
[52] U.S. Cl. .................. 395/704; 395/183.14; 395/705
[58] Field of Search ............................ 395/700, 704, 395/183.14, 705

[56] References Cited

U.S. PATENT DOCUMENTS

| 4,916,810 | 4/1990 | Bapat | 364/300 |
|---|---|---|---|
| 4,931,928 | 6/1990 | Greenfeld | 364/300 |
| 5,293,629 | 3/1994 | Conley et al. | 395/700 |
| 5,404,531 | 4/1995 | Wakatani | 395/700 |

OTHER PUBLICATIONS

IBM Technical Disclosure Bulletin, "Assembler Macro Implementation Messages," vol. 37, No. 5, May 1, 1994, pp. 19–27.

K. Kantorowitz et al., "Automatic Generation of Useful Syntax Error," Software–Practice and Experience, vol. 16, No. 7, Jul. 1986, pp. 627–640.

Zhu, "A Practical and Space Efficient Scheme for Keeping Source Code Location in Parse Trees," Proceedings of the Annual International Computer Software and Applications Conference, Phoenix, Nov. 1, 1993, No. Conf. 17, IEEE, pp. 374–379.

*Primary Examiner*—Kevin A. Kriess
*Assistant Examiner*—Kakali Chaki
*Attorney, Agent, or Firm*—Graham & James LLP

[57] ABSTRACT

A method and apparatus for generating more helpful error messages during compilation of a software program. The software program contains a macro definition and an invocation of the macro. The macro is expanded during the compilation process. The invention generates several tables that save the history of the macro expansion. If an error occurs during compilation of the macro, the invention prints an error message, using the saved history information, that specifically identifies the location of the error in the source program of the macro and the history of the macro expansion. The invention can print multi-line macro histories for nested macro calls.

18 Claims, 7 Drawing Sheets

TOKEN LIST

Token 24 '(',C_LParen
Token 25 '',C_Nothing
Token 26 '',C_Nothing
Token 27 '',C_Nothing
Token 29 'AR',C_Identifier
Token 30 '[',C_Nothing
Token 31 '#1',C_Nothing
Token 32 ']',C_Nothing
Token 33 '',C_Nothing
Token 34 'AA',C_MacroName
Token 35 'b',C_Identifier
Token 36 ' ',C_WhiteSpace
Token 37 ' ',C_WhiteSpace
Token 38 ')',C_RParen
Token 39 '(',C_LParen
Token 40 '',C_Nothing
Token 41 '',C_Nothing
Token 42 '',C_Nothing
Token 43 '',C_Nothing
Token 44 '#1',C_Nothing
Token 45 '+',C_Nothing
Token 46 'AA',C_Nothing
Token 47 '(',C_Nothing
Token 48 '#2',C_Nothing
Token 49 ')',C_Nothing
Token 50 '',C_Nothing
Token 51 'int',C_Identifier
Token 52 ' ',C_WhiteSpace
Token 53 'x',C_Identifier
Token 54 '=',C_Assign
Token 55 'B',C_Identifier
Token 56 '(',C_LParen
Token 57 'AA',C_Identifier
Token 58 '(',C_LParen

FIG. 10(b)

TOKEN LIST(CONT.)

Token 59 'y',C_Identifier
Token 60 ')',C_RParen
Token 61 ',',C_Comma
Token 62 'z',C_Identifier
Token 63 ')',C_RParen
Token 64 ';',C_SemiColon
Token 65 'J',C_WhiteSpace
Token 66 C_Formal       #0
Token 67 '+',C_Plus
Token 68 'AA',C_Identifier
Token 69 '(',C_LParen
Token 70 C_Formal       #1
Token 71 ')',C_RParen
Token 72 'AA',C_Identifier
Token 73 '(',C_LParen
Token 74 'y',C_Identifier
Token 75 ')',C_RParen
Token 76 'AR',C_Identifier
Token 77 '[',C_LBracket
Token 78 C_Formal       #0
Token 79 ']',C_RBracket
Token 80 'y',C_Identifier
Token 81 'AA',C_Marker
Token 82 'z',C_Identifier
Token 83 'B',C_Marker
Token 84 'AR',C_Identifier
Token 85 '[',C_LBracket
Token 86 C_Formal       #0
Token 87 ']',C_RBracket
Token 88 'z',C_Identifier
Token 89 'AA',C_Marker

| | TOKEN # |
|---|---|
| LOCATION IN SOURCE PROGRAM OF TOKEN #29 (LINE 1, POS 15, FILE EX4.C) | 29 |
| ⋮ | |
| LOCATION IN SOURCE PROGRAM OF TOKEN #44 (LINE 2, POS 16, FILE EX4.C) | 44 |
| ⋮ | |
| LOCATION IN SOURCE PROGRAM OF TOKEN #55 (LINE 3, POS 7, FILE EX4.C) | 55 |
| ⋮ | |
| LOCATION IN SOURCE PROGRAM OF TOKEN #57 (LINE 3, POS 9, FILE EX4.C) | 57 |

SOURCE LOCATION TABLE

FIG. 12

DESTINATION TABLE: 1202 src=66 dst=55 n=6 ⎫ LEFT
src=72 dst=66 n=4 ⎬ BRANCHES
src=76 dst=72 n=4 ⎭ OF TREE
src=80 dst=78 n=1
src=82 dst=70 n=1
src=84 dst=68 n=4
src=88 dst=86 n=1

SOURCE TABLE: 1302 src=44 dst=66 n=6 ⎫ RIGHT
src=57 dst=72 n=4 ⎬ BRANCHES
src=29 dst=76 n=4 ⎭ OF TREE
src=74 dst=80 n=1
src=62 dst=82 n=1
src=29 dst=84 n=4
src=82 dst=88 n=1

⋮

METHOD AND APPARATUS FOR DISPLAYING LOCATIONS OF ERRORS DETECTED INSIDE SOFTWARE MACRO CALLS

BACKGROUND OF THE INVENTION

This invention relates to a method and apparatus for compiling a software program and, more particularly, to a system and method for providing accurate information concerning errors detected during compilation of a software program.

Certain computer languages, such as the C computer language, are called "high level languages." High level languages allow a programmer to write a computer program in a form that is easily read and understood by human beings. Such a computer program is called a "source program." The source program is input to another computer program called a "compiler," which converts the source program to an "object program." An object program has a format that is easily understood and executed by a computer. During compilation, the compiler breaks the components of the source program into "tokens," which are then further processed by the compiler to yield the object program.

Conventional compilers often produce a printed report detailing the status of the compilation process. Such a report includes error messages listing errors discovered in the source program during compilation. An example of an error in a source program that might cause an error message would be the use of an "undefined symbol" in the source program.

Certain high level languages, such as the C programming language, include programming constructs called "macros." Macros generally contain a portion of a computer program that is used in more than one place in the source program. The contents of a macro are specified in a "macro definition" within the source program. During compilation, a macro is inserted into the source program at a point in the source program containing a "macro call" for that macro. The process of inserting a macro into the source program at the location of a macro call is called "macro expansion." In most high level languages, a macro call to a second macro can be "nested" inside a macro definition of a first macro to produce a "nested macro call."

When an error occurs during compilation of a source program containing a macro call, conventional compilers do not produce helpful error messages. Conventional compilers identify only the line number of the macro call, but do not identify the line number within the macro where the compilation error actually occurred. Moreover, conventional compilers do not print error messages showing a history of macro expansion. Conventional compilers are especially unhelpful when the compiler is compiling nested macro calls. Even though a nested macro call might expand to multiple lines of source program, a conventional compiler will only identify the line number in the source program of the original macro call. What is needed is a compiler that prints error messages that more specifically identify a location of an error during compilation of macro calls.

SUMMARY OF THE INVENTION

The present invention is an apparatus and method providing a compilation error message that specifically identifies a location of an error during compilation of macro calls. The error message also provides a history of macro expansion for both simple macro calls and nested macro calls. Specifically, the present invention generates and prints a compilation error message identifying a location of the macro description that contains the compilation error. Furthermore, the present invention generates a history of the expansion of the macro that caused the compilation error.

The present invention provides a method for converting a source program to an object program, comprising the steps of: compiling the source program to yield the object program, wherein the source program includes a macro definition and an instruction calling the macro defined in the macro definition, and wherein the compiling step includes the substep of expanding the instruction calling the macro; generating history information representing the substep of expanding the macro, so that the locations in the source program of the macro definition and the instruction calling the macro are saved; determining whether an error occurred when the macro was expanded during the compiling step; and printing an error message if an error occurred, in accordance with the history information, so that the error message specifically identifies the location of the error within the source program of the macro definition and of the instruction calling the macro.

Various advantages of the present invention will become more fully apparent when the following detailed description of the invention are read in conjunction with the accompanying drawings.

BRIEF DESCRIPTION OF THE DRAWINGS

The invention will now be described with reference to the accompanying drawings, wherein:

FIGS. 10(a) and 10(b) show respective portions of tokens generated from the source program of FIG. 4.

DETAILED DESCRIPTION OF THE PREFERRED EMBODIMENTS

The following description is of the best presently contemplated modes of carrying out the invention. This description is made for the purpose of illustrating the general principles of the invention and is not to be taken in a limiting sense.

Figure 1:
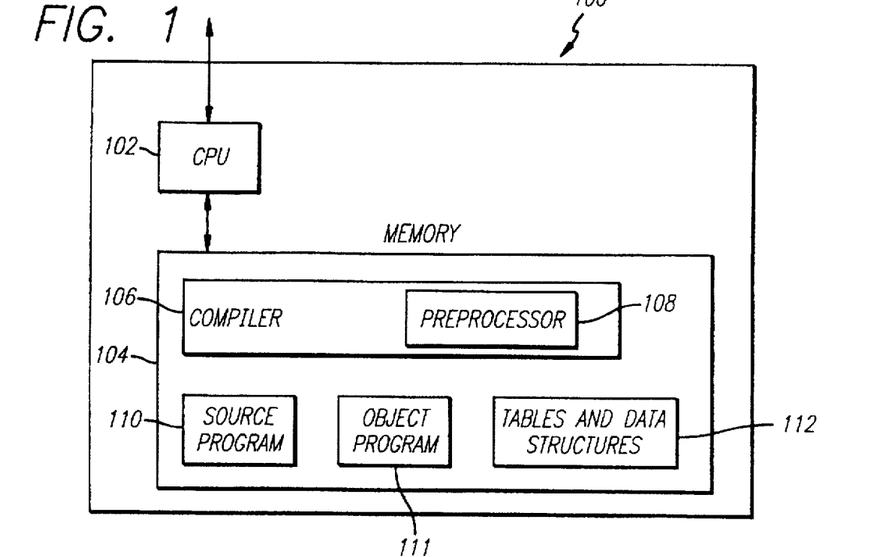
FIG. 1 is a block diagram of a computer system in accordance with a preferred embodiment of the present invention.

FIG. 1 is a block diagram of a computer system in accordance with a preferred embodiment of the present invention. FIG. 1 includes a computer system 100, which includes a CPU 102 and a memory 104. Computer system 100 may also contain various disk drives, printers, keyboards, input and output devices, and network connections, etc. (not shown). Memory 104 includes a compiler software program 106 (which includes a compiler preprocessor software program 108), a source program 110, an object program 111, and various tables and data structures 112, which are described in more detail below. As will be understood by a person of ordinary skill in the art, memory 104 also contains an operating system (e.g., Unix) and various other software programs and data necessary for the functioning of computer system 100. These components are not shown for the sake of clarity. Computer system 100 preferably is a Sun Microsystems' Sparcstation, or a computer systems based on Intel's 80486 processor, the Power PC processor, or Hewlett Packard's HP9000 processor, although other computers capable of performing the steps described below could also be used to implement the present invention.

Compiler 106 preferably are implemented in the Unix "lint" code checker. The present invention can, however, be implemented in any system that compiles C-type macros. In a preferred embodiment, the present invention is invoked as an option from the command line of the lint preprocessor, although the present invention can be invoked in any appropriate manner.

Figure 2:
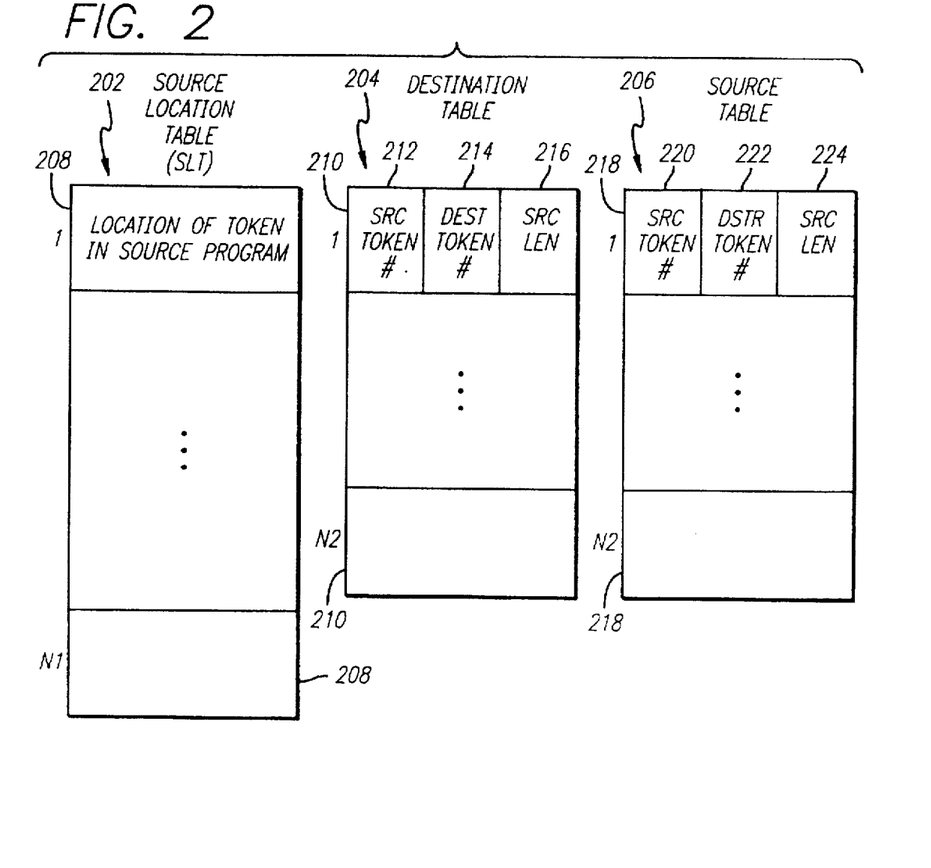
FIG. 2 shows formats of three tables stored in a memory of the computer system of FIG. 1.

FIG. 2 shows formats of three tables stored in memory 104 of computer system 100 of FIG. 1. These tables include a source location table 202, a destination table 204, and a source table 206. As described below in more detail, source location table 202 holds the locations in source program 110 of tokens generated from source program 110 by preprocessor 108 during a compilation process. Source location table 202 has tagged entries and each entry in source location table 202 indicates a location of a token in source program 110 being compiled (e.g., file, line number, and position within the line). Source location table 202 has a plurality of entries 208 having various formats as described below in connection with FIG. 3.

Destination table 204 and source table 206 also are generated by preprocessor 108 during compilation and are used to hold the "history" of macro expansion contained in source program 110. Destination table 204 and source table 206 have formats as described below. The entries in each table are organized by ascending token numbers, although not every token number may have an entry in tables 204 and 206.

Each entry 210 of destination table 204 has a format including three fields. A first field 212 contains a token number of a source token. A second field 214 contains a token number of a destination token. A third field 216 contains a length of a source token list that begins with the source token of that table entry. Examples of entries in the destination table and a further description of its use are described in connection with FIG. 12.

Each entry 218 of source table 206 has a format including three fields. A first field 220 contains a token number of a source token. A second field 222 contains a token number of a destination token. A third field 224 contains a length of the source token list that begins with the destination token of that table entry. Examples of entries in the source table and a further description of its use are described in connection with FIG. 13.

In a preferred embodiment, the source and destination tables require K·N bytes of memory, where K is approximately 9 through 12 and N is a number of macro calls contained in the source program. Various known memory compression techniques can be used to save memory storage space.

FIGS. 3(a), 3(b), 3(c), and 3(d) show various formats of entries in source location table 202 of FIG. 2. In a preferred embodiment, the various entry formats are used to save space in source location table 202, but are not necessary for the operation of the invention. Source location table 202 contains an entry for each token in a line of the source program being compiled. Each entry indicates a location of the token in the source program. Each rectangular box in FIG. 3 indicates a byte. Thus, the entries of source table 202 having the format of FIGS. 3(a) and 3(b) contain one byte and the entries having the format of FIGS. 3(c) and 3(d) contain five bytes.

Figure 3A:
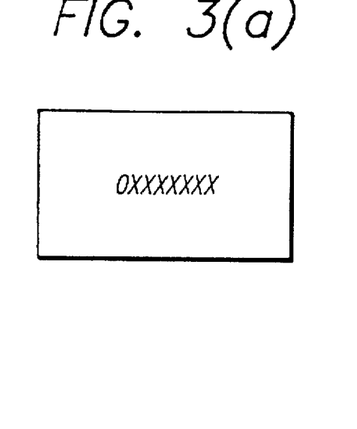
FIGS. 3(a), 3(b), 3(c) and 3(d) show detailed formats of entries in a source table of FIG. 2.

The format of FIG. 3(a) is used when a location of a token differs from that of a previous token only by its position within a line, i.e., when the file and the line number of the current token are the same as those of the previous token. As indicated in the Figure, if a most significant bit in the entry is "0", then the entry represents a relative offset for position with a line. In the described embodiment, the offset can be between 0 and 7F (hexadecimal), i.e., up to seven bits long. "X" in FIG. 3 indicates a "don't care" value.

Figure 3B:
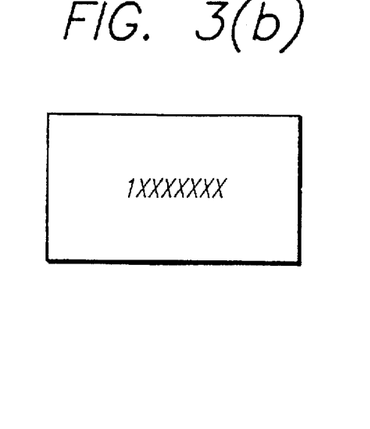

The format of FIG. 3(b) is used when a token is located at a different line number than the previous token, i.e., when the file number of the current token is the same as that of the previous token. The position within the line is assumed to be "1". As indicated in the Figure, if a most significant bit in the entry is "1" (and the first byte of the entry does not contain EF (hexadecimal) or FF (hexadecimal), then the entry represents a relative offset for a line number. In the described embodiment, the offset can be between 0 and 7 F (hexadecimal), i.e., up to seven bits long.

Figure 3C:
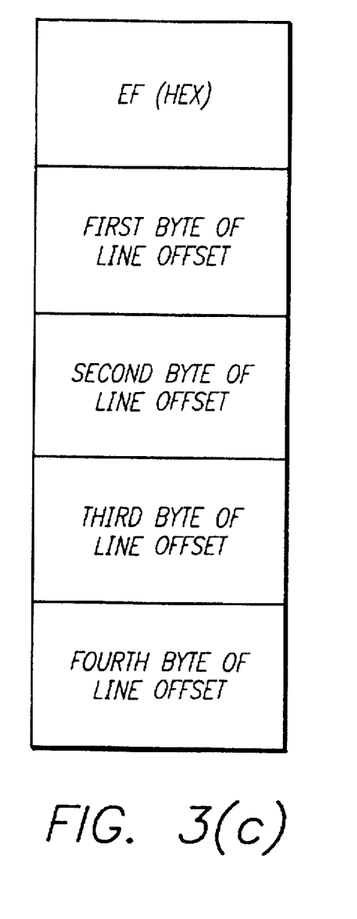

The format of FIG. 3(c) is used when a location of a token differs from that of a previous token by more than a predetermined number of lines. As indicated in the Figure, if the first byte of the entry contains FE (hexadecimal), then the entry is followed by four bytes containing a line offset. In the described embodiment, the format of FIG. 3(c) is used if the line offset exceeds 125 lines because the format of FIG. 3(b) can only contain line offsets between 0 and 125. In the described embodiment, the line offset may be between 0 and FFFFFFFF (hexadecimal), since four bytes are allocated for its storage. The position within the line is assumed to be "1".

Figure 3D:
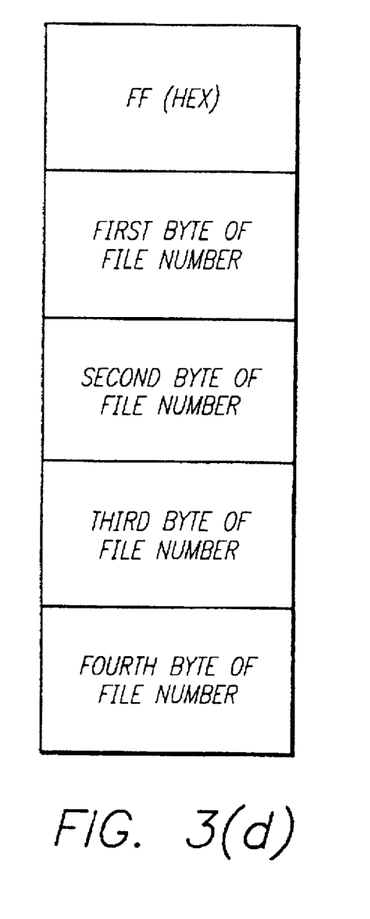

The format of FIG. 3(d) is used when a token is located in a different file than the previous token. As indicated in the Figure, if the first byte of the entry contains FF (hexadecimal), then the entry is followed by four bytes containing a file number. In the described embodiment, the file number may be between 0 and FFFFFFFF (hexadecimal) because four bytes are allocated for its storage. This number corresponds to a file name, as determined by a file name table (not shown) stored in memory 104. The line number and position are assumed to be "1".

In a preferred embodiment, the source location table is stored using Huffman coding, in a manner known to persons of ordinary skill in the art, where each "delta" shown in FIGS. 3(a) through 3(d) is stored as a four bit value. Thus, the source location table requires K·N bytes of memory, where K is a small number approximately between 0.5 and 1 and where N is a number of original source tokens. The representation used to store the source and destination tables and the source location table are not the most important aspect of the present invention, and any suitable storage representation can be used to implement the invention.

Figure 4:
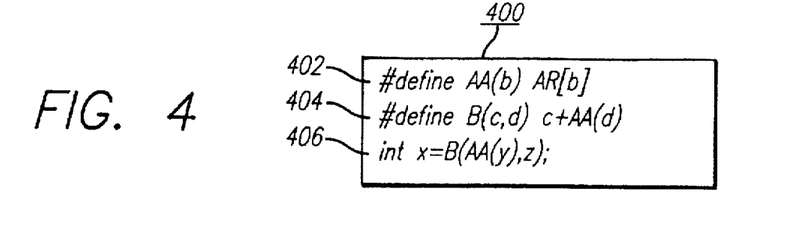
FIG. 4 is an example of a source program.

FIG. 4 is an example of a source program 400 written in the C programming language. Although the example given herein deals with macros in the C programming language, it should be understood that the present invention can be implemented in a compiler for other compiled language that includes C-like macros.

Source program 400 of FIG. 4 has three lines. A first line 402 is a macro definition for a first macro named "AA". The macro definition specifies that the body of macro AA calls an array named "AR". A second line 404 of the source program is a macro definition for a second macro named "B". The macro definition for B contains a call to a macro name passed as a parameter and a call to the macro AA. A third line 406 of the source program is a definition of a variable "x" that contains a call to the macro B. Line 406 also passes the call of macro AA to macro BB as a first argument. The source program does not include a definition for the array AR. Therefore, when compiler 108 compiles the source program, array AR is an undefined symbol. This undefined macro reference causes compiler 108 to generate an error message as shown in FIG. 6. This error message is generated in accordance with the data structure of FIG. 5.

Figure 5:
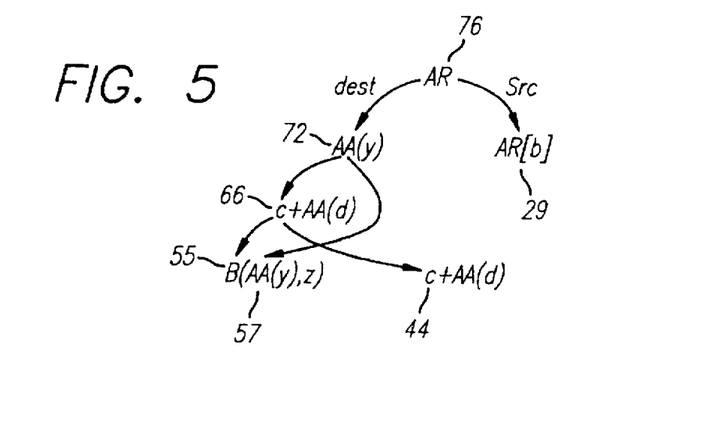
FIG. 5 is an example of a tree data structure represented by the destination and source tables created from the source program of FIG. 4.
Figure 6:
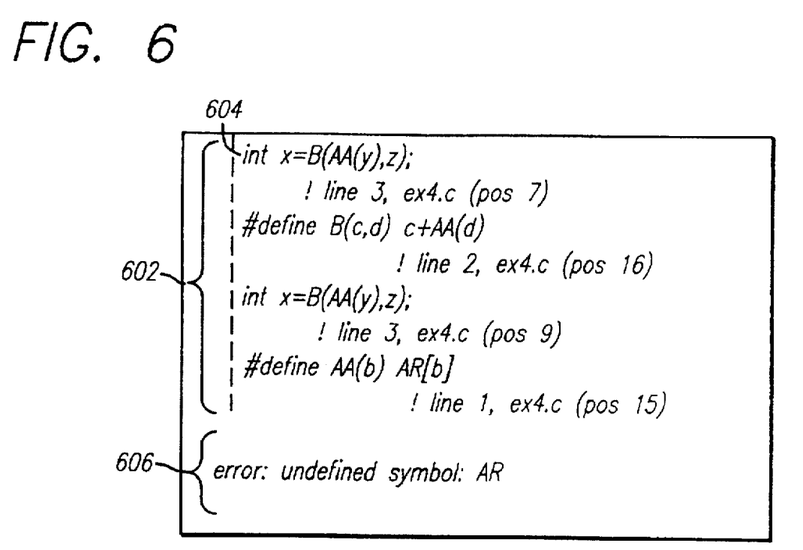
FIG. 6 is an example of an error message output when the source program of FIG. 4 is compiled.

FIG. 5 shows a portion of a tree data structure created from the source program of FIG. 4. Specifically, the tree shown in FIG. 5 shows the history of the macro expansion for the symbol AR. In the described embodiment, the tree data structure is built in the destination and source tables 204 and 206, although is should be understood that the tree data structure of FIG. 5 can be implemented using any appropriate data structure or method. In FIG. 5, token AR is the head of the tree. A left branch of the tree represents the destination of a macro when the macro is expanded during a macro call. Thus, following the left branch in FIG. 5, the array AR is used in the definition of macro AA (node 72), which is called in the definition c+AA(d) in macro B (where the symbol "c" is bound to "AA") (node 66), which is called in the source program statement B(AA(y),z) (node 55). A right branch of the root node represents the source of the token AR (node 29). The fight branches of nodes 72 and 66 represent the sources of those macro calls.

FIG. 6 is an example of an error message generated when the source program of FIG. 4 is compiled in accordance with the present invention. When the compiler discovers an undefined symbol error for token AR, the compiler uses a recursive procedure known to persons of ordinary skill in the art to traverse the tree of FIG. 5 to generate the macro history 602 shown in FIG. 6. The tree is traversed in a left to right, top to bottom order and each leaf of the tree represents a line in the error message. Thus, the compiler accesses node 55 (the leftmost and lowest node of the tree) and prints the location in the source program that contains "int x=B(AA (y),z);", i.e., line 3, file ex4.c, position 7 of the source program (see line 604 of the error message).

The compiler obtains the location of the node 55 from source location table 202, as described below. The other lines of macro history 602 in the error message are similarly generated by continuing to traverse the tree and printing a line in the error message for each leaf node in the tree. Thus, the lines of the source program corresponding to the leaves of the tree yield a history of the expansion of undefined symbol AR. Lastly, the compiler prints the type of error discovered (here "error: undefined symbol: AR") as line 606 of the error message.

Figure 7:
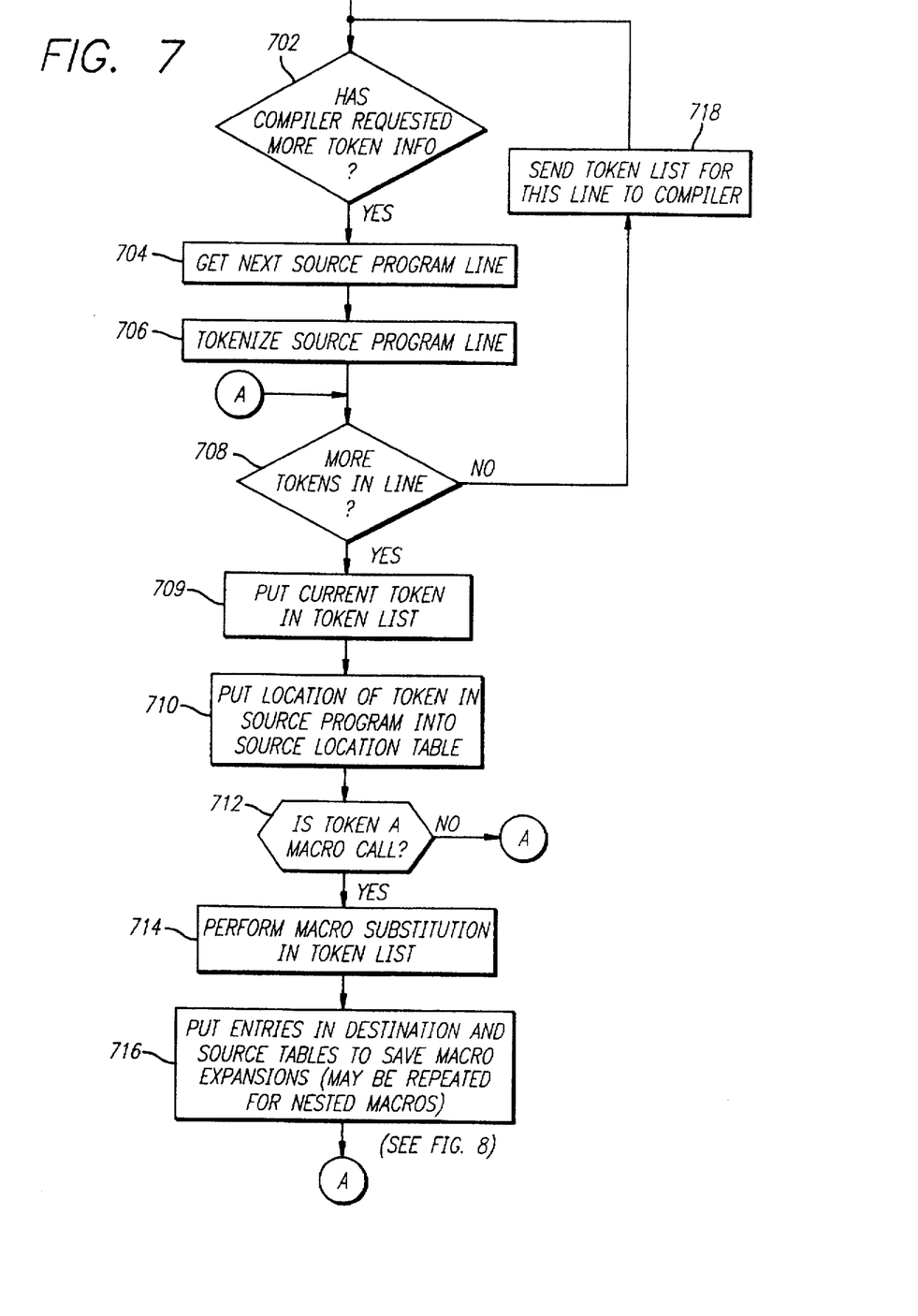
FIG. 7 is a flow chart showing steps performed during compilation of a source program to generate the source location table, the destination table, and the source table.
Figure 8:
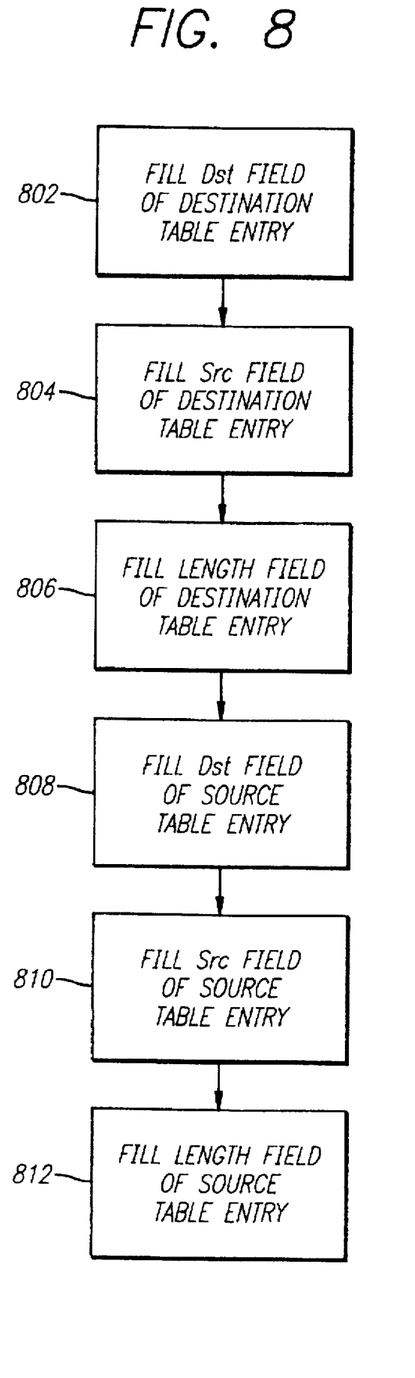
FIG. 8 is a flow chart showing further detail of FIG. 7.
Figure 9:
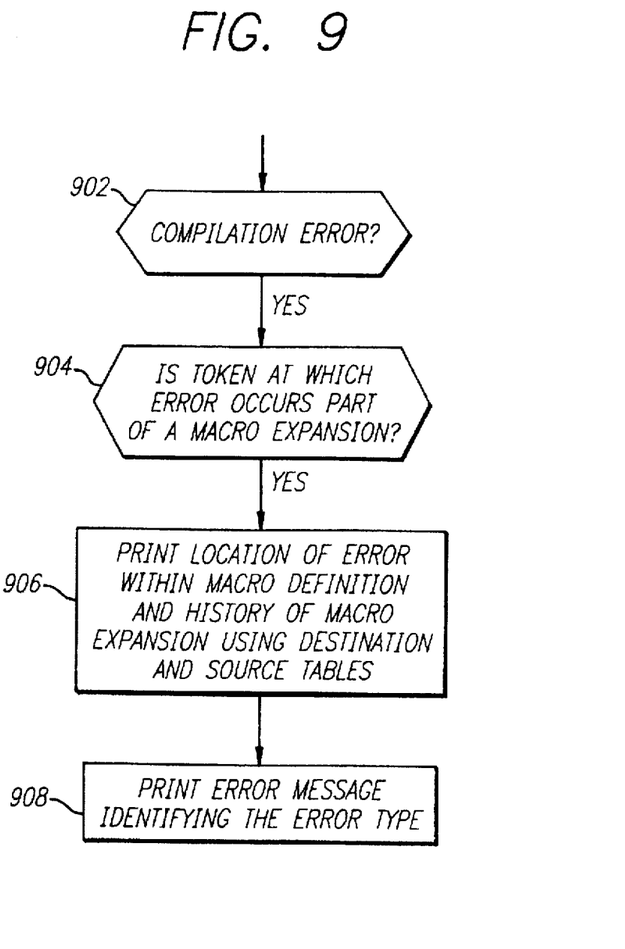
FIG. 9 is a flow chart showing steps performed during compilation of a source program to generate an error message reflecting the location in the source program of an error detected inside a macro expansion and a history of the macro expansion.

FIGS. 7–13 show an implementation of the example in FIGS. 4–6. FIGS. 7 and 8 are flow charts showing steps performed during compilation to create the tables of FIGS. 11–13. FIG. 9 is a flow chart showing steps performed during compilation to generate an error message using the tables of FIGS. 11–13. In the described embodiment, the steps of FIGS. 7–9 are performed by CPU 102 executing software instructions, such as software instructions of preprocessor 108 (in compiler 108) or of compiler 108.

The steps of FIGS. 7 and 8 are performed by preprocessor 108, as it pre-processes source program 400 and passes tokens to compiler 108 for compilation. In step 702, CPU 102 determines whether compiler 108 has requested information for additional lines of the source program. If so, CPU 102 inputs another line of source program 400 in step 704. In step 706, the new line of the source program is "tokenized" in a manner known to persons of ordinary skill in the art. During tokenization, the source program is broken down into tokens and the tokens are numbered. In the described embodiment, tokenization is performed in conformance with ISO (International Standards Organization) Standard 9899. Tokenizing source program 400 results in tokens such as those shown in FIGS. 10(a) and 10(b). In the described embodiment, preprocessor 108 tokenizes one line of the source program at a time and sends the tokens to compiler 108 for compilation. Thus, FIG. 10 is included herein for the sake of example, and may not exist in its entirety at any time during compilation.

Figure 11:
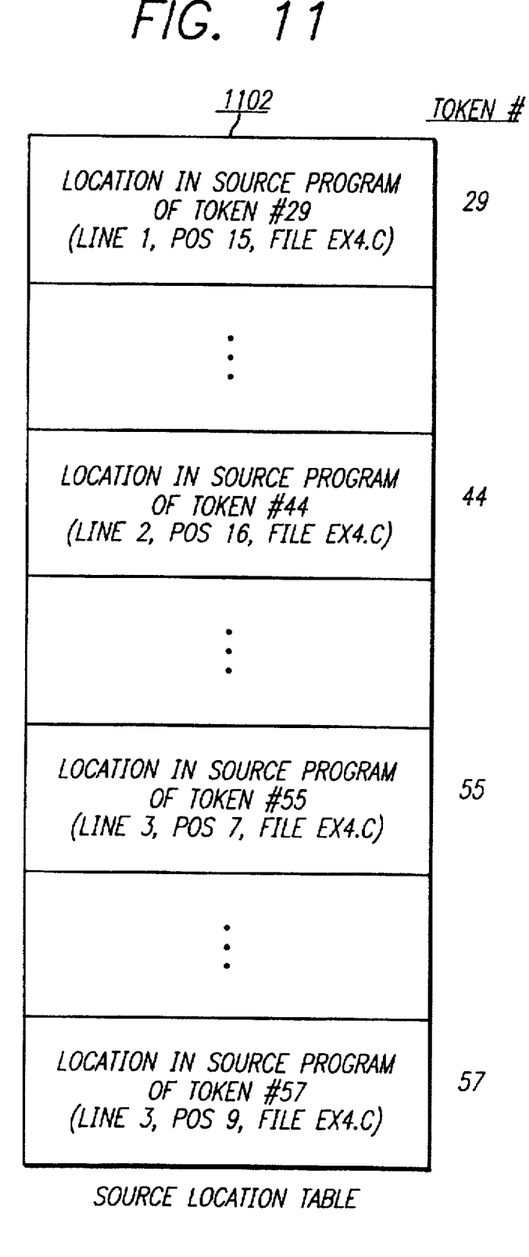
FIG. 11 is an example of portions of a source location table generated from the source program of FIG. 4.

If, in step 708, not all tokens in the current line of the source program line have been processed, control passes to step 709. In step 709 a new current token is placed in a token list (not shown) in memory 104. In step 710, the location of the token is entered into source location table 1102 of FIG. 11. Source location table 1102 contains the location in source program 400 for each token. FIG. 11 shows a portion of source location table 1102 for source program 400. It will be understood by persons of ordinary skill in the art that source location table 1102 may be implemented using any format that allows the compiler to identify a location in the source program for various tokens. For example, in FIG. 11, source location table 1102 indicates that token number 29 (the token "AR") is located at line 1, position 15 in source program 400. Similarly, token number 44 (the token "c") is located at line 2, position 16; token number 55 (the token "B") is located at line 3, position 7; and token number 57 (the token "AA") is located at line 3, position 9. The tokens shown in FIG. 11 correspond to the leaves of the tree structure of FIG. 5. It should be understood that source location table 1102 includes other entries, i.e., one entry for each token in source program 400. There are no entries in source location table 1102 corresponding to the interior nodes of the tree. These nodes have entries in the source and destination tables.

If, in step 712, the next token is the beginning of a macro call, control passes to step 714. Otherwise control returns to step 708. In step 714, preprocessor 108 expands the macro and places the result of the expansion in the token list that will be used by compiler 108.

Figure 12:
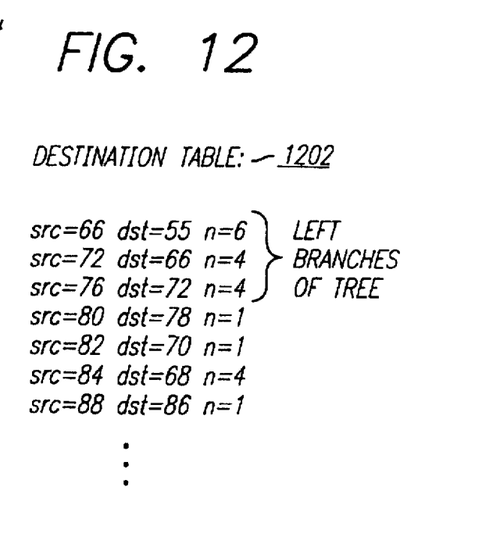
FIG. 12 an example of a destination table generated from the source program of FIG. 4.
Figure 13:
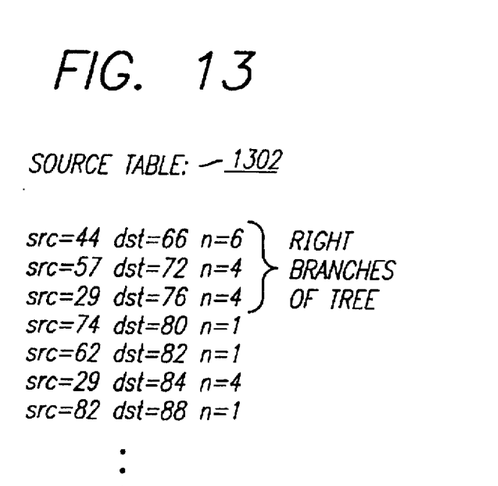
FIG. 13 is an example of a source table generated from the source program of FIG. 4.

The steps of FIG. 8, which are performed each time a macro expansion occurs during compilation, save the history of the macro expansion in destination table 1202 and in source table 1302. In step 716 CPU 102 saves the history of a macro expansion by placing an entry in each of destination table 1202 and source table 1302 for each macro expansion performed. Nested macro calls result in multiple entries in the destination and source tables, as in the example. Details of step 716 are shown in FIG. 8. Each time a macro is expanded by preprocessor 108, three values are entered in destination table 1202 and three values are entered in source table 1302, respectively.

An example of a nested macro expansion is given below. The source program statement "B(AA(Y),z)" corresponds to tokens 55–62. This source program statement is expanded to "c+AA(d)" (tokens 66–71), where "c" is expanded to "AA (y)" (tokens 72–75), which is in turn expanded to "AR" (token 76). Inspection of the tree structure of FIG. 5 shows that the left branches of the tree correspond to this expansion. Further inspection of destination table 1202 of FIG. 12 shows that the first three entries in the table of FIG. 12 correspond to the three left branches of the tree. In a similar manner, the first three entries in the table of FIG. 13 correspond to the three right branches of the tree. The right branches represent the "source" of the macro calls.

The entries shown in FIGS. 12 and 13 are created in accordance with the flow chart of FIG. 8 and have a format shown in FIG. 2. The tree of FIG. 5 (as represented by the table entries of FIGS. 12 and 13) is created upwardly from its lower leftmost leaf. Thus, for the macro call "B(AA(y), z)", an token value of 55 is placed in the Dst field of a current entry of the destination table 1202 (step 802). Because the macro call is expanded as "c+AA(d)" a token value of 66 and a length of 6 also are placed in the Src and Len fields of the current entry of destination table 1202 (steps 804 and 806).

Next, since the character string "c+AA(d)" contains 6 tokens, a token number of 66 and a length of 6 are placed in a the Dst and Len fields of a current entry of source table 1302 (steps 808 and 812). Because the character string "c" has a source of "c+AA(d)" the token 44 is placed in the Src field of the current entry of source table 1302 (step 810). These six steps are repeated for the expansion of "c" into "AA(y)" and for the expansion of "AA(y)" into "AR" to yield the first three entries in tables 1202 and 1302. Tables 1202 and 1302 also show additional entries not discussed herein in detail. Similarly, the entries for the expansion of, e.g., "AA(d)" (line 2, position 18) is not shown in the example, but is performed in a manner similar to that described above.

Returning to FIG. 7, after step 716, control returns to step 708. If all the tokens on a current line of the source program have been processed, the token list for the current line is sent to the compiler (see FIG. 9) and control returns to step 702.

FIG. 9 is a flow chart showing steps performed during compilation to generate an error message. Compiler 108 generates any error messages in accordance with the present invention. The general operation of compiler 108 is known to persons of ordinary skill in the art and will not be discussed herein. If the CPU (in step 902) detects a compilation error that occurs within a macro expansion (step 904), the CPU prints a history of the macro expansion using the destination and source tables (in step 906). Specifically, the compiler calls an error routine that traverses the tree stored in the destination and source tables that has a root node corresponding to the error (e.g., the undefined symbol). The tree is traversed from top to bottom and from left to right. Thus, for example, when compiler 108 determines that "AR" is an undefined symbol, it prints the error message of FIG. 6 in accordance with leaves of the tree of FIG. 5.

For example, the left branches of the tree are traversed by starting at an entry corresponding to the root node and repeatedly searching destination table 1202 for subsequent nodes until a first entry is found that does not have a corresponding second entry with a Src field contents equal to the Dst field of the first entry (e.g., the first entry in destination table 1202). When this event occurs, the Dst field represents a leaf node and the location of the leaf node is obtained from source location table 1102. Tree traversal is well understood by persons of ordinary skill in the art and will not be described in detail herein. Lastly, in step 908 the compiler prints a message that identifies the type of error found, as shown in FIG. 6 (e.g., "undefined symbol").

In summary, printing a history of the macro expansion for the macro in which a compilation error occurred and specifically identifying the location of the error within a macro definition provides helpful information during compilation, which in turn leads to faster and more efficient development of computer programs.

Several preferred embodiments of the present invention have been described. Nevertheless, it will be understood that various modifications may be made without departing from the spirit and scope of the invention. For example, other orders of macro substitution history tree tracing could be used. Instead of printing source lines and error messages on paper, the compiler could display them using a graphical user interface in a text editor window of an integrated development environment. Instead of storing the source location table, the second pass on the source text by the preprocessor could be used for restoring the source location of any token. This last modification would significantly reduce the amount of memory required.

In describing the preferred embodiments, a number of specific technologies used to implement the embodiments of various aspects of the invention were identified and related to more general terms in which the invention was described. However, it should be understood that such specificity is not intended to limit the scope of the claimed invention.

What is claimed is:

1. A method for displaying an error message that includes history of a macro expansion of a source program when an error is detected during compilation of the source program, comprising the steps, performed by a computer system, of:

compiling the source program to yield an object program, wherein the source program includes a macro definition and an instruction calling a macro defined in the macro definition, and wherein the compiling step includes a substep of expanding the instruction calling the macro;

generating history information in a memory for each token in the source program when performing the substep of expanding the macro, so that a location of each token, including the line number and the position within each line, in the source program of the macro definition and of the instruction calling the macro are saved;

determining whether an error occurred when the macro was expanded during the compiling step; and printing an error message if an error occurred, in accordance with the saved history information, so that the error message specifically identifies the location of the error, including the line number and the position, within the source program for multiple lines of the macro expansion, the macro expansion including at least one line of the macro definition and at least the instruction calling the macro.

2. The method of claim 1, wherein the printing step further includes the step of printing a message identifying a type of error that occurred when the macro was expanded during the compiling step.

3. The method of claim 1, wherein the source program is written in the C programming language.

4. The method of claim 1, wherein the history generating step includes the step of generating history information in which a character string in the source program is represented by a single, unique token number.

5. The method of claim 1, wherein the determining step includes the step of determining the location, including the line number and position within the line, of the compilation error in the source code and wherein the location of the compilation error is represented by a single, unique token number stored in a table in the memory.

6. The method of claim 1, wherein the history information includes a tree data structure storing the source and destination of the macro expansion performed during the compilation step.

7. The method of claim 1, wherein the history information is stored in a destination table and a source table in the memory.

8. The method of claim 7, wherein the destination table and the source table require K·N bytes of memory, where K is a number having a value of 9 through 12 and N is the number of macro calls contained in the source program.

9. The method of claim 1, wherein the locations of tokens in the source program are stored in a source location table.

10. The method of claim 9, wherein the source location table requires K·N bytes of memory, where K is a number between 0.5 and 1 and N is a number of original source tokens in the source program.

11. The method of claim 1, wherein the source program includes a second macro definition and a nested instruction calling a second macro defined in the second macro definition, wherein the nested instruction is within the first macro definition, wherein the compiling step includes a substep of expanding the instruction calling the first and second macros;

wherein the history generating step saves the locations including line number and position within each line number in the source program of the first and second macro definitions and of the first and second instructions calling the macros;

wherein the determining step includes the step of determining whether an error occurred when the second macro was expanded during the compiling step; and wherein the printing step includes the step of printing an error message if an error occurred, in accordance with the saved history information, so that the error message specifically identifies the location, including the line number and position within the line, of the error within the source program of the second macro definition and the location, including the line number and position within the line of the first and second instructions.

12. An apparatus for displaying an error message that includes history of a macro expansion when an error is detected during compilation of a source program, comprising:

a memory storing the source program;

a compiler portion, coupled to the memory that compiles the source program to yield the object program, wherein the source program includes a macro definition and an instruction calling a macro defined in the macro definition, wherein the compiler portion expands the instruction calling the macro;

a history generator, coupled to the memory that generates history information that is stored in the memory for each token in the source program of the macro expansion, so that a location of each token, including the line number and the position within each line, in the source program of the macro definition and of the instruction calling the macro are saved;

a determining portion, coupled to the compiler portion and determining whether an error occurred when the macro was expanded during compilation; and a printing portion that prints an error message if an error occurred during compilation, in accordance with the saved history information, so that the error message specifically identifies the location, including the line number and position within the line, of the error within the source program of multiple lines of the macro expansion, the macro expansion including at least one line of the macro definition and at least the instruction calling the macro.

13. The apparatus of claim 12, wherein the printing portion also prints a message identifying a type of error that occurred when the macro was expanded during compilation.

14. The apparatus of claim 12, wherein the history generator generates history information in which a character string in the source program is represented by a single, unique token number.

15. The apparatus of claim 12, wherein the determining portion determines the location, including the line number and position in the line, of the compilation error in the source code and wherein the location of the compilation error is represented by a single, unique token number stored in a table in the memory.

16. The apparatus of claim 12, wherein the locations of tokens including the line numbers and the positions within each of the lines in the source program are stored in a source location table in the memory.

17. The apparatus of claim 12, wherein the history information includes a tree data structure storing the source and destination of the macro expansion performed during compilation.

18. The apparatus of claim 12, wherein the source program includes nested macro calls;

wherein the compiler portion expands the nested macro calls;

wherein the history generator saves the locations, including the line numbers and positions within each of the lines, in the source program of the nested macro calls;

wherein the determining portion determines whether an error occurred when the nested macro calls were expanded during compilation; and wherein the printing portion prints an error message if an error occurred, in accordance with the history information, so that the error message specifically identifies the location, including the line number and position within the line, of the error within the source program of the nested macro calls.

* * * * *